US005729304A

United States Patent [19]
Lim

[11] Patent Number: 5,729,304
[45] Date of Patent: Mar. 17, 1998

[54] DEVICE FOR FIXING DEFLECTION YOKE TO BRAUN TUBE

[75] Inventor: Jong Ho Lim, Daeku, Rep. of Korea

[73] Assignee: Goldstar Co., Ltd., Seoul, Rep. of Korea

[21] Appl. No.: 330,307

[22] Filed: Oct. 27, 1994

[30] Foreign Application Priority Data

Sep. 28, 1993 [KR] Rep. of Korea ............... 20023/1993

[51] Int. Cl.$^6$ ................................................. H04N 5/64
[52] U.S. Cl. .................. 348/830; 348/831; 313/440; 335/212
[58] Field of Search ................... 348/828, 831; 313/440; 335/210–215; H04N 5/64

[56] References Cited

U.S. PATENT DOCUMENTS

| | | | |
|---|---|---|---|
| 3,629,751 | 12/1971 | Massa | 348/829 |
| 4,110,793 | 8/1978 | Tajiri | 348/829 |
| 4,117,516 | 9/1978 | Yasuhara | 348/829 |
| 4,785,219 | 11/1988 | Soemers et al. | 348/829 |
| 4,939,415 | 7/1990 | Iwasaki et al. | 348/830 |

*Primary Examiner*—Kim Vu
*Attorney, Agent, or Firm*—David E. Lovejoy

[57] ABSTRACT

A device for simply and precisely fixing a deflection yoke to a Braun tube in such a manner that it does not permanently affix the yoke to the Braun tube but permits the location and fixing angle of the yoke with respect to the Braun tube be easily changed as required. The device includes a holder, coupled to a separator, and a plurality of wedge type cams rotatably mounted on the holder. The holder is provided with a plurality of mounts for rotatably supporting the wedge type cams respectively, a plurality of releasable fixing members for fixing the cams at their adjusted angles, and connection bands extending between the mounts for connecting the mounts together. The wedge type cams not only adjust the yoke fixing angle for compensation of mis-alignment of electron gun but also releasably affix the deflection yoke to the Braun tube. In another embodiment, the wedge type cams may be substituted by pulley type cams which are rotatably mounted on the holder.

8 Claims, 4 Drawing Sheets

(PRIOR ART)
FIG.—1

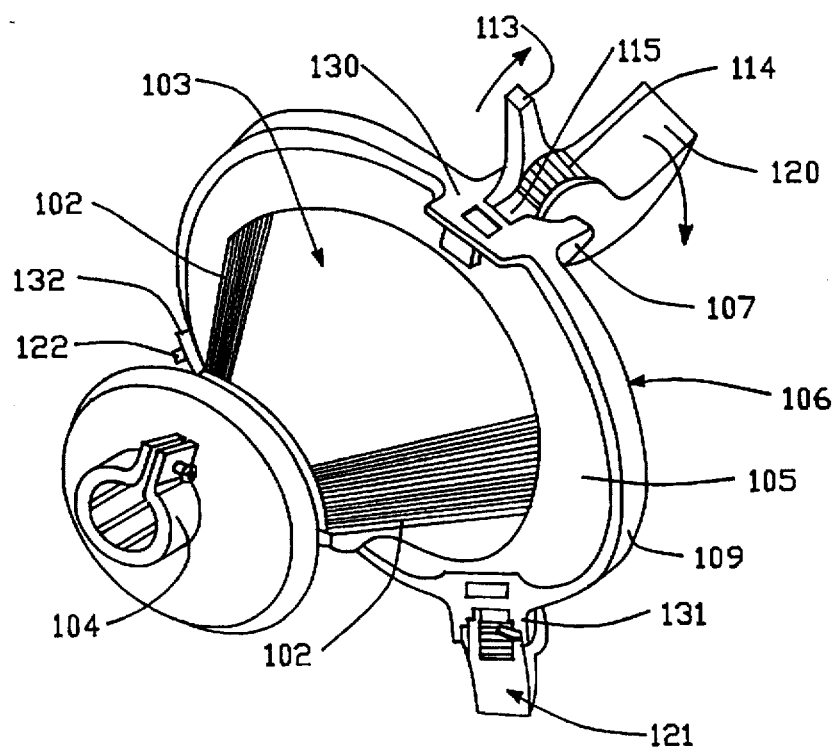
FIG.—4
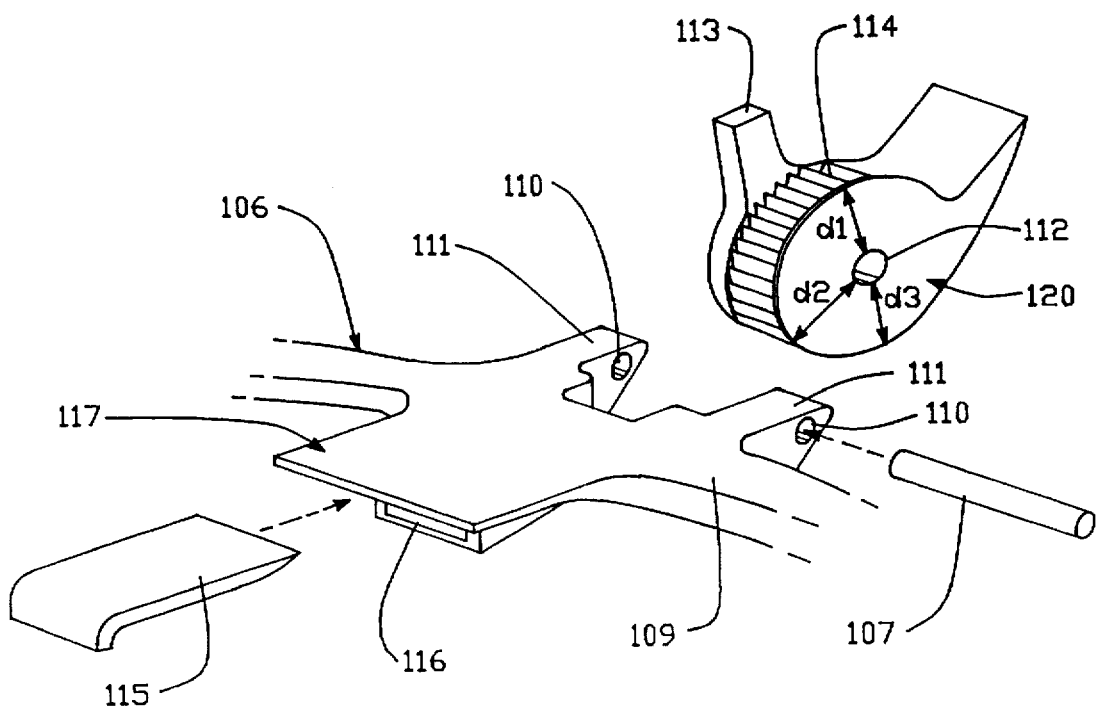
FIG. 5

DEVICE FOR FIXING DEFLECTION YOKE TO BRAUN TUBE

BACKGROUND OF THE INVENTION

1. Field of the Invention

The present invention relates in general to a Braun tube having a deflection yoke and, more particularly, to an improved structure in a deflection yoke fixing device for such Braun tube suitable for providing simple and precise compensation of mis-alignment of electron gun.

2. Description of the Prior Art

As shown in FIG. 1, a typical Braun tube includes a generally rectangular screen 7 at its front section. A panel 1 integrally extends rearwardly from the edge of the rectangular screen 7 to a predetermined depth. The Braun tube further includes a funnel 2 which extends rearwardly from the rear edge of the panel 1. The funnel 2 is gradually reduced in its sectional area from front to the back. Here, the panel 1 and the funnel 7 constitute a so-called bulb 4. A hollow conical deflection yoke 8 partially surrounds the rear section of the bulb 4 at the front of a neck portion 3. This deflection yoke 8 generates a vertical magnetic field and a horizontal magnetic field. The neck portion 3 of the Braun tube receives therein an electron gun 6.

Turning to FIG. 2, there is shown in an enlarged perspective view a conventional deflection yoke 8 of the Braun tube. The hollow conical deflection yoke 8 is provided with a horizontal deflection coil 10 having a saddle type winding which is fixed to the front inside edge of the yoke 8. The deflection yoke 8 also includes a vertical deflection coil 11 having a toroidal type winding which is fixed to the outside surface of the yoke 8. The mounting of the deflection yoke 8 on a predetermined portion of the bulb 4 is achieved by a mounting band 12 which is provided on the rear end of the yoke 8.

FIG. 3 is a sectional view showing the relative position of the deflection yoke 8 mounted to the Braun tube. As shown in this drawing, the deflection yoke 8 is fixed to the predetermined portion of the funnel 2 and spaced apart at its front section from the funnel 2 by a predetermined interval or gap. A plurality of deflection yoke adjusting members 14 are placed in the gap between the front section of the yoke 8 and the outer surface of the funnel 2. These adjusting members 14 are used for angular adjustment of the deflection yoke 8 with respect to the Braun tube. Each adjusting member 14 has a right-angled triangle profile, for example, a wedge type profile, when sectioned. With the wedge type structure of the adjusting members 14, the gradient of the yoke 8 with respect to the bulb 4 is adjusted by controllably wedging the adjusting members 14 in the gap between the yoke 8 and the funnel 2 while letting one surface of each adjusting member 14 come into contact with either the yoke 8 or the funnel 2. As described above, the deflection yoke 8 is provided with the horizontal deflection coil 10 having the saddle type winding which is fixed to the front inside edge of the yoke 8. In addition, the rear end of the yoke 8 is provided with the mounting band 12 which mounts the deflection yoke 8 on the predetermined portion of the bulb 4.

In the operation of the above-described typical Braun tube, the Braun tube does not require compensation of the vertical convergence of the electron beams 5 of the electron gun 6 but requires compensation of the horizontal convergence of the electron beams 5. In addition, a vertical distortion of the electron beams 5 requires compensation. In the above-described deflection yoke 8, the compensation of the horizontal convergence and the compensation of the vertical distortion of the electron beams 5 are carried out by the horizontal deflection coil 10 and the vertical deflection coil 11 respectively. That is, the electron beams 5 of the electron gun 6 are compensated in their convergence by the deflection yoke 8 fixedly mounted on the predetermined portion of the bulb 4. Here, the compensation of the convergence of the electron beams 5 should be achieved by angular adjustment of the deflection yoke 8. Such an angular adjustment of the yoke 8 is achieved by controlling the plurality of adjusting members 14 which are placed in the gap between the yoke 8 and the bulb 4.

The adjusting members 14 for angular adjustment of the yoke 8 are manually controlled. Thereafter, a manual operation is carried out for desired angle adjustment for compensating the mis-alignment. In the manual operation for such a yoke fixing angle adjustment, one worker tightly grips the deflection yoke 8 and, at the same time, another worker moves the adjusting members 14 one by one in opposed directions while viewing the screen 7 until a precise fixing angle of the deflection yoke 8 is set for completely removing the mis-alignment of the picture from the screen 7. When the precise fixing angle of the deflection yoke 8 is set in accordance with the above-described yoke fixing angle adjustment, the deflection yoke 8 should be affixed to the bulb 4 at that angle. This is achieved by a bonding operation using a bonding agent such as silicon bond for tightly bonding both the deflection yoke 8 and the adjusting members 14 in place to the bulb 4.

However, a problem has been noted with the above-described deflection yoke adjusting members 14 constituting the conventional deflection yoke fixing device, as follows.

The precise fixing of the deflection yoke 8 to the predetermined portion of the bulb 4 at an angle, at which fixing angle there occurs no mis-alignment of the electron gun necessitates performing a burdensome manual operation requiring at least two workers. That is, in the manual operation for fixing angle adjustment of the deflection yoke 8, one worker must tightly grips the deflection yoke 8 while, at the same time, another worker moves the adjusting members 14 one by one in opposed directions while viewing the screen 7 until the precise angle of the yoke 8 is set and the mis-alignment is completely removed from the screen 7. In this regard, the conventional deflection yoke fixing device uneconomically requires too much labor and time for performing the yoke angle adjusting operation. This inevitably decreases productivity as well as increasing the cost of production of the Braun tubes, thus deteriorating the competitiveness power of the products.

SUMMARY OF THE INVENTION

It is, therefore, an object of the present invention to provide a deflection yoke fixing device for a Braun tube in which the above-mentioned problem of the conventional device can be overcome and which simply and precisely fixes the deflection yoke to the Braun tube in such a manner that it does not permanently affix the yoke to the Braun tube but permits the location and fixing angle of the yoke with respect to the Braun tube to be easily changed as required.

In order to accomplish the above object, a device for fixing a deflection yoke to a Braun tube in accordance with an embodiment of the present invention includes: a holder coupled to a separator, the separator being provided at a front section of the deflection yoke for supporting both a vertical deflection coil and a horizontal deflection coil, the coils forming a horizontal magnetic field and a vertical magnetic field in the Braun tube respectively; and a plurality of wedge type cams rotatably mounted on the holder, the wedge type cams not only adjusting the yoke fixing angle for compensation of mis-alignment of electron gun but also releasably affixing the deflection yoke to the Braun tube.

In accordance with another embodiment, the yoke fixing device may include a plurality of pulley type cams rotatably mounted on the holder for both adjusting the yoke fixing angle for compensation of mis-alignment of electron gun and for releasably affixing the deflection yoke to the Braun tube.

BRIEF DESCRIPTION OF THE DRAWINGS

The above and other objects, features and advantages of the present invention will be more clearly understood from the following detailed description taken in conjunction with the accompanying drawings, in which:

FIG. 4 is a perspective view of a deflection yoke provided with a yoke fixing device including a wedge type cam in accordance with a first embodiment of the present invention;

FIG. 5 is an exploded perspective view of the yoke fixing device of FIG. 4; and

DESCRIPTION OF THE PREFERRED EMBODIMENTS

Figure 1:
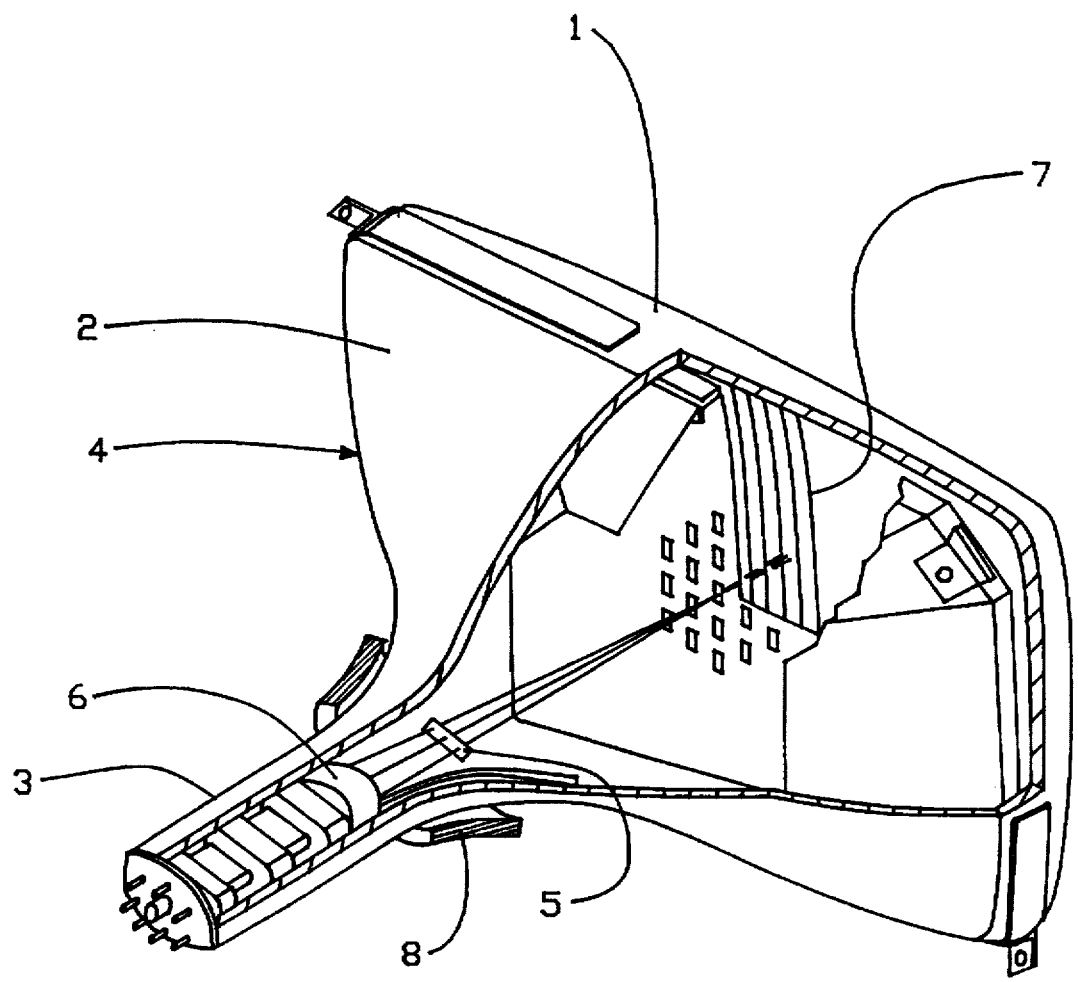
FIG. 1 is a partially broken perspective view of a typical Braun tube having a conventional deflection yoke.
Figure 2:
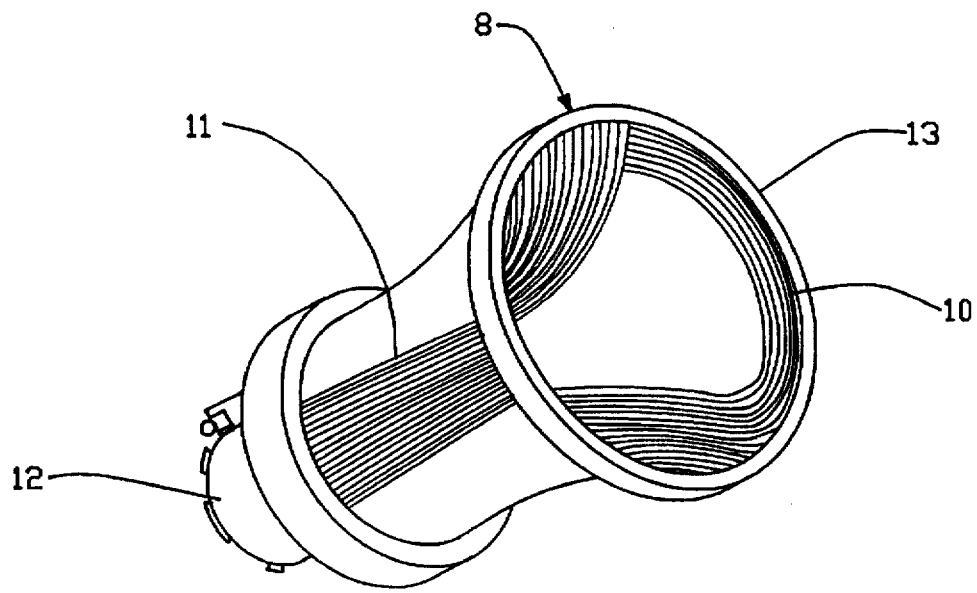
FIG. 2 is a perspective view of the conventional deflection yoke of FIG. 1.
Figure 3:
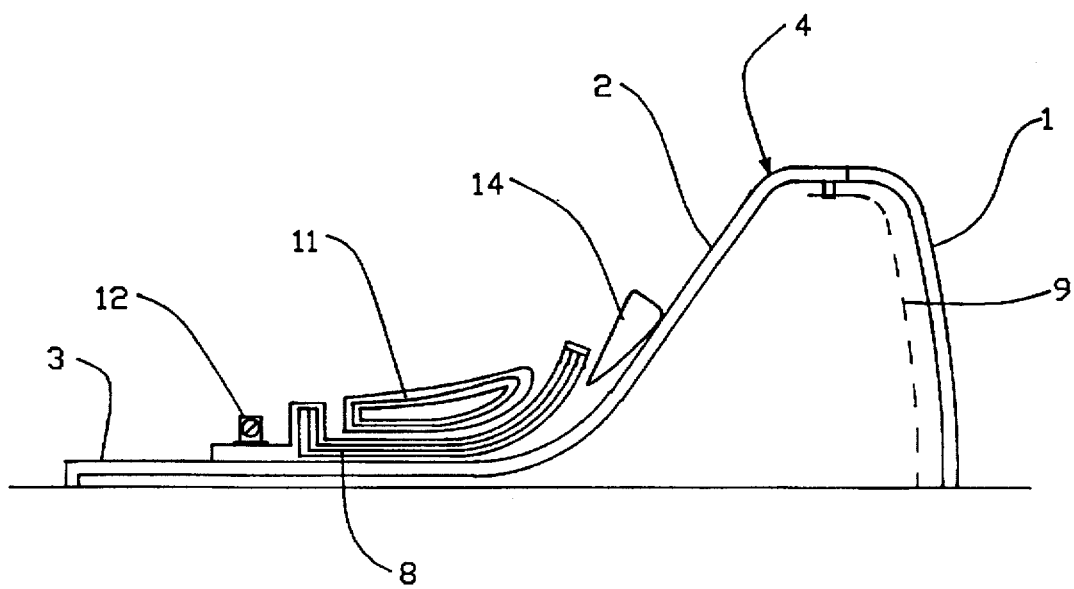
FIG. 3 is a sectional view showing the relative position of the conventional deflection yoke fixed to the Braun tube using a conventional fixing device.

With reference to FIG. 4, there is shown a deflection yoke having a yoke fixing device in accordance with a first embodiment of the present invention. In this drawing, the frusto-conical deflection yoke is designated by reference numeral 103. The yoke fixing device includes the deflection yoke 103 proper and a holder 106, the holder 106 being coupled to a separator 105 mounted on the front of the yoke 103. This separator 105 supports both the vertical deflection coil and the horizontal deflection coil of the yoke 103. Three wedge type rotatable cams 120, 121 and 122 for adjusting the yoke fixing angle are rotatably mounted on the holder 106. The yoke fixing device further includes three rearwardly extending protrusions 117 provided on the holder 106 for receiving therein ratchet plates 115, which ratchet plates 115 are releasably engaged with and respectively fix the wedge type cams 120, 121 and 122 at their predetermined heights. The vertical deflection coil 102 of the deflection yoke 103 is a toroidal type coil. A mounting band 104 is integrally formed on the rear end of the yoke 103 for mounting the deflection yoke 103 on a predetermined portion of a bulb of a Braun tube. The holder 106 which is coupled to the separator 105 at the outer front edge of the deflection yoke 103 has the same diameter as that of the outer front edge of the yoke 103. This holder 106 also has a predetermined thickness. Three mounts 130, 131 and 132 are formed on the holder 106 such that they are circumferentially spaced at regular angular intervals thereasound. That is, a mount 130, 131 or 132 is provided on the holder 106 every 120° therearound. Each mount 130, 131 or 132 corresponds to a respective protrusion 117, so that a protrusion 117 is provided on the holder 106 circumferentially every 120° therearound in the same manner as described for the mounts 130, 131 and 132. Connection bands 109 integrally extend between the three pairs of mounts 130, 131 and 132 and protrusions 117, thus to connect them to each other and to form the single body of holder 106.

FIG. 5 is an exploded perspective view of the yoke fixing device of FIG. 4. It will be noted that the yoke fixing device includes the holder 106 provided with the wedge type cams 120, 121 and 122 rotatably mounted on the holder 106.

As may be seen in FIG. 5, while the holder 106 includes the three ratchet receiving protrusions 117 and the three mounts 130, 131 and 132, there is only one such protrusion 117 and one mount 130 shown in this drawing. This holder 106, which is an elastic body having a predetermined width and a predetermined thickness, is fixed and coupled to the outer front edge of the deflection yoke 103 as described above. Each mount 130, 131 or 132 for rotatably supporting a corresponding wedge type cam 120, 121 or 122 includes two spaced support arms 111 integrally extending forwardly from the holder 106 to a predetermined length. Each support arm 111, for example, of the first mount 130 has formed therein a horizontal shaft hole 110 having a predetermined depth and a predetermined diameter. The shaft holes 110 of the support arms receive the opposed ends of a shaft 107 having a predetermined length and a predetermined diameter, thus to rotatably mount, for example, the first wedge type cam 120 on the first mount 130. Each protrusion 117 of predetermined length, width and height integrally extends from the holder 106 in an opposite direction to the support arms of a corresponding mount 130, 131 or 132. The ratchet receiving protrusions 117 receive their elastic ratchet plates 115 for fixing the rotatable wedge type cams 120, 121 and 122. Each elastic ratchet plate 115 having a predetermined length, width and thickness is sharpened at its front end at a predetermined acute angle. In order to receive the ratchet plates 115, each protrusion 117 is provided with an insertion slit 116 therein whose size is slightly larger than that of the ratchet plate 115. The insert slit 116 extends to the gap between the support arms of a corresponding mount, thus to allow the sharpened end of the ratchet plate 115 to project into the gap.

Each of the wedge type cams, for example, the first cam 120, is provided with a plurality of teeth on its circumferential surface 114, thus to provide a ratchet wheel which will cooperate with the ratchet plate 115. A lever 113 of a predetermined length is provided at one side of the cam 120. The wedge type cam 120 has a shaft hole 112 whose diameter is equal to that of the shaft holes 110 of the support arms of the mount 130. Here, in order to form the desired cam shape, the wedge type cam 130 is constructed such that the relation of the distances between its shaft hole 112 and its toothed outer circumferential surface 114 is set to be $d_1 < d_2 < d_3$ as represented in FIG. 5.

The operation of the above-described yoke fixing device will be explained.

First, in order to mount the yoke fixing device on a predetermined outer portion of the Braun tube, the deflection yoke 103 is fitted over the Braun tube using its mounting band 104. All of the levers 113 of the wedge type cams are, thereafter, fully turned counterclockwise opposite to the direction of the arrows in FIG. 4 until each lever 113 comes into abutting contact with its respective mounts 130, 131 and 132. The Braun tube is in turn supplied with power prior to checking mis-alignment. When there is a mis-alignment in the image, it should be first determined which cam of the three wedge type cams 120, 121 and 122 will be first manipulated for adjusting the yoke fixing angle. When a wedge type cam, for example, the first cam 120 will be first manipulated, the lever 113 of the first cam 120 is manually slowly turned clockwise in the direction of the arrow in FIG. 4 so as to precisely adjust the fixing angle of the deflection yoke 103 about the first cam 120. The gradual clockwise turning motion of the lever 113 causes the fixing angle of deflection yoke 103 with respect to the Braun tube to gradually increases about the first cam 120. Such gradual increasing of the yoke fixing angle caused by the clockwise turning motion of the lever 113 is due to the specific relationship of the distances between the shaft hole 112 and the toothed outer surface 114 of the first cam 120 which is set to be $d_1<d_2<d_3$ as represented in FIG. 5. When a beam mis-alignment corresponding to the first cam 120 is completely compensated by the above-described manipulation of the first cam 120, the levering motion is stopped and the elastic ratchet plate 115 is inserted into the insert slit 116 of the protrusion 117 until its sharpened end is releasably engaged with a corresponding tooth of the toothed surface 114 of the first cam 120. Hence, the desired yoke fixing angle adjustment by the first cam 120 is finished. In the same manner, the second and third cams 121 and 122 are manually controlled so as to adjust the yoke fixing angles corresponding to them and to compensate for the mis-alignment of electron gun. The above-described yoke fixing angle adjustment renders the Braun tube free of mis-alignment of the electron gun.

Figure 6:
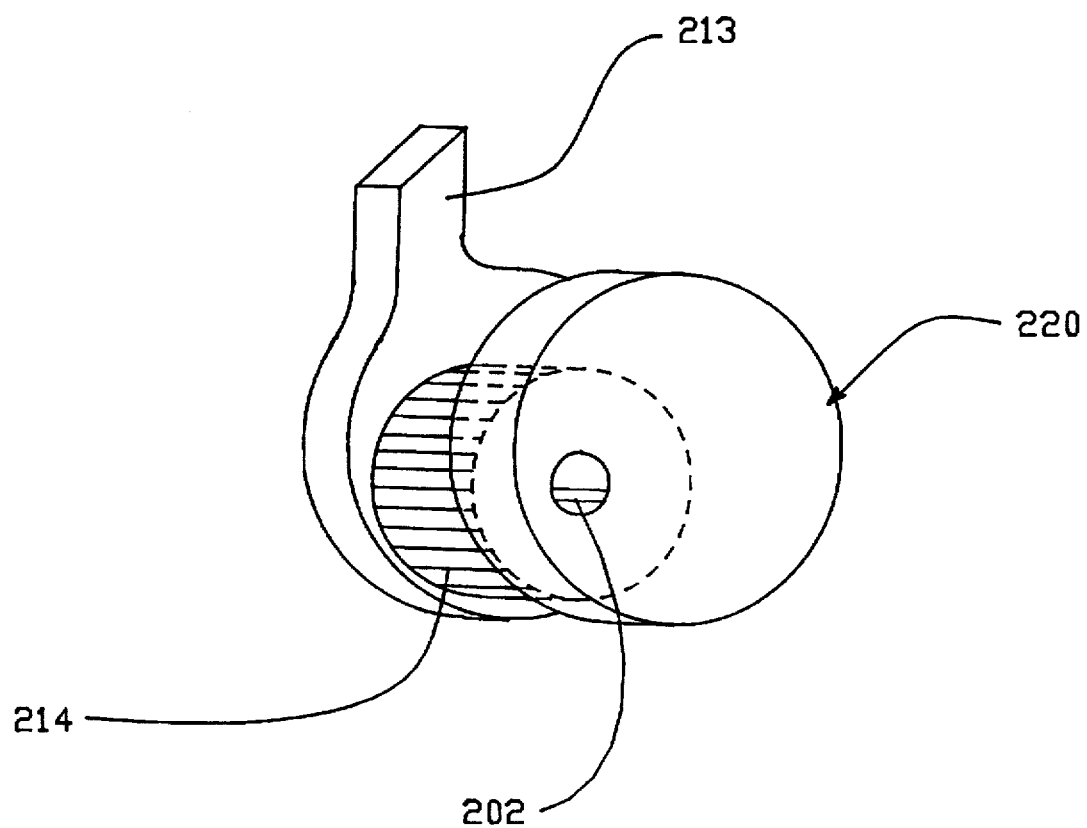
FIG. 6 is a perspective view of a pulley type cam of the deflection yoke fixing device in accordance with another embodiment of the present invention.

FIG. 6 is a perspective view of a deflection yoke fixing device in accordance with another embodiment of the present invention. In this embodiment, the yoke fixing angle adjustment is achieved by pulley type cams 220 each of which includes lever 213 of a predetermined length extending radially outward from a side flange of the pulley type cam 220. A toothed cylinder body or a ratchet wheel body 214 of a predetermined diameter is bounded sided by a pair of eccentric side flanges of the cam 220 at its opposed sides. Hence, the ratchet wheel body 214 is eccentric from the opposed side flanges, thus to form a cam. The diameter of the ratchet wheel body 214 is smaller than that of each side flange of the cam 220. The ratchet wheel body 214 is provided on its outer surface with a predetermined number of teeth. In the pulley type cam 220, the shaft hole 202 of a predetermined diameter for receiving the shaft 107 passes through the center of the ratchet wheel body 214 but eccentrically passes through the opposed side flanges eccentrically bouncing the opposed sides of the ratchet wheel body 214.

When adjusting the yoke fixing angle for compensating a mis-alignment of the electron gun by manipulation of the above pulley type cams 220, each of the levers 213 of the cams 220 are fully turned counterclockwise in the drawings until the levers 213 come into abutting contact with stop ends of their mounts 130, 131 and 132. After determination of which cam of the three pulley type cams 220 will be first manipulated, the lever 213 of a cam 220 to be first manipulated is manually slowly turned clockwise so as to precisely adjust the fixing angle of the deflection yoke 103 about the cam 220. Because the shaft hole 202 of the cam 220 is eccentric from the center of the side flanges of the cam 220, the clockwise turning motion of the lever 213 causes the portion of the deflection yoke 103 about the manipulated cam 220 to be lifted up from the bulb of the Braun tube, thus to adjust the yoke fixing angle for compensating the mis-alignment of the electron gun. When adjusting the yoke fixing angle for compensating the mis-alignment of the electron gun using the conventional yoke fixing device, one worker should tightly grip the deflection yoke and, at the same time, another worker should move the adjusting members one by one in opposed direction while viewing the screen until the precise fixing angle of the yoke is set and the mis-alignment of the electron gun is completely compensated for and removed from the screen. Such a conventional deflection yoke fixing device thus uneconomically wastes much labor and time in the yoke angle adjusting operation; nevertheless, the conventional device achieves no precise fixing angle adjustment. The above problem of the conventional device is overcome by the yoke fixing device of the present invention.

That is, in comparison with the conventional yoke fixing device, the new yoke fixing device of the present invention fixes the deflection yoke to the Braun tube more quickly and more precisely. The fixing of the deflection yoke to the Braun tube at a precise angle causing no mis-alignment of the electron gun is simply achieved by engaging elastic ratchets with the ratchet wheel bodies of the cams turned to desired angles. This makes it possible to automate the process for both adjusting the yoke fixing angle and affixing the deflection yoke to the Braun tube.

Furthermore, the conventional fixing device permanently affixes the deflection yoke to the Braun tube using a bonding agent such as silicon bond, so that it allows no change of yoke fixing angle after fixing of the yoke. However, the ratchet wheel bodies of the cams and their elastic ratchets of this invention can be easily disengaged from each other when the deflection yoke angle needs changing, so that the yoke fixing device of this invention allows the yoke angle to be easily changed as demanded.

Although the preferred embodiments of the present invention have been disclosed for illustrative purposes, those skilled in the an will appreciate that various modifications, additions and substitutions are possible, without departing from the scope and spirit of the invention as disclosed in the accompanying claims.

What is claimed is:

1. A device for fixing a deflection yoke to a Braun tube comprising:

holder means for supporting the deflection yoke on the Braun tube; and a plurality of cam-shaped deflection yoke adjusting means rotatably mounted on said holder means for adjusting a fixing of said deflection yoke with respect to the Braun tube and also for releasably affixing said deflection yoke to said Braun tube.

2. A device for fixing a deflection yoke to a Braun tube comprising:

holder means for supporting the deflection yoke on the Braun tube; and a plurality of cam means rotatably mounted on said holder means for adjusting a fixing of said deflection yoke with respect to the Braun tube and also for releasably affixing said deflection yoke to said Braun tube and wherein said holder means includes, a plurality of mounts integrally provided on said holder means for each rotatably supporting a corresponding one of said cam means;

releasable fixing means for fixing each of said cam means at an adjustable fixing angle with respect to the Braun tube, said release fixing means being integrally provided on said holder means at positions corresponding to each of said mounts respectively; and connection bands extending between said mounts for connecting of the mounts with each other.

3. The yoke fixing device according to claim 2, wherein each of said mounts comprises a pair of spaced support arms extending from said holder means for rotatably supporting a corresponding cam means therebetween, said support arms being each provided with shaft holes having a predetermined depth and a diameter, said shaft holes receiving opposed ends of a shaft for rotatably mounting thereon said cam means.

4. The yoke fixing device according to claim 2, wherein said releasable fixing means includes a plurality of elastic ratchet plates, inserted through a plurality of inserted slits formed in said holder means, each releasably engagable with a corresponding one of said cams means for fixing said cam means in place.

5. A device for fixing a deflection yoke to a Braun tube comprising:

holder means for supporting the deflection yoke on the Braun tube; and a plurality of cam means rotatably mounted on said holder means for adjusting a fixing of said deflection yoke with respect to the Braun tube and also for releasably affixing said deflection yoke to said Braun tube and wherein said cam means includes, a ratchet wheel body for being releasably engaged with a ratchet plate of said holder, said ratchet wheel body being provided with elastic teeth on an outer circumferential surface thereof;

a ratchet wheel turning lever integrally extending radially outwardly from a side of said ratchet wheel body to a predetermined length, said lever having a predetermined thickness; and a shaft hole eccentrically formed in said ratchet body, said shaft hole receiving a shaft for rotatably mounting the ratchet wheel body on the holder means.

6. The yoke fixing device according to claim 5, wherein said ratchet wheel body is rotatable in opposed directions by levering motion of the ratchet wheel turning lever.

7. A device for fixing a deflection yoke to a Braun tube comprising:

holder means for supporting the deflection yoke on the Braun tube; and a plurality of cam means rotatably mounted on said holder means for adjusting a fixing of said deflection yoke with respect to the Braun tube and also for releasably affixing said deflection yoke to said Braun tube and wherein each of said cam means includes, a ratchet wheel body eccentrically bounded by opposed eccentric side flanges and provided with elastic teeth an outer circumferential surface thereof;

a ratchet wheel turning lever integrally extending radially outward from one of said side flanges to a predetermined length, said lever having a predetermined thickness; and a linear shaft hole formed in said cam means such that it passes through the center of said ratchet wheel body but eccentrically passes through said side flanges, said shaft hole receiving a shaft for rotatably mounting said cam means on the holder.

8. The yoke fixing device according to claim 7, wherein said ranched wheel body is rotatable in opposed directions by levering motion of the ranched wheel turning lever.

* * * * *